W. W. KING.
AUTOMATIC VIEW FINDER.
APPLICATION FILED MAY 28, 1914.
1,137,864.
Patented May 4, 1915.
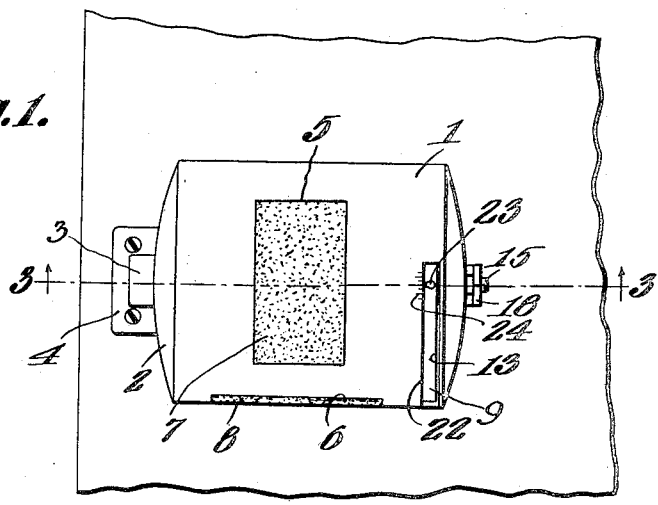
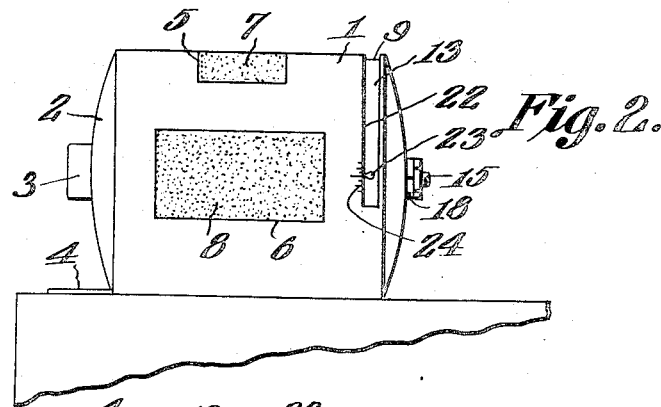
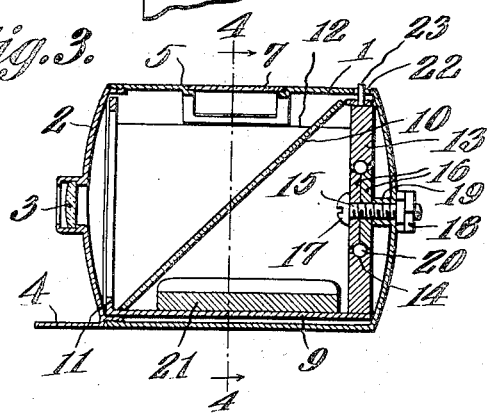
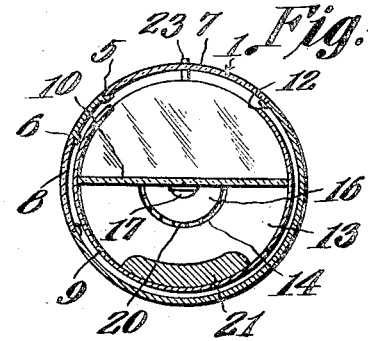
Witnesses
Walter W. King,
Inventor
by C. A. Snow & Co.
Attorneys

UNITED STATES PATENT OFFICE.

WALTER W. KING, OF DENVER, COLORADO.

AUTOMATIC VIEW-FINDER.

1,137,864.

Specification of Letters Patent.  Patented May 4, 1915.

Application filed May 22, 1914. Serial No. 841,592.

*To all whom it may concern:*

Be it known that I, WALTER W. KING, a citizen of the United States, residing at Denver, in the county of Denver and State of Colorado, have invented a new and useful Automatic View-Finder, of which the following is a specification.

The present invention appertains to view finders for cameras, and the like, and aims to provide a novel and improved automatic view finder, which will adjust itself to either the horizontal or vertical position of a camera.

The present invention contemplates the provision of an automatic view finder of unique construction, whereby the device will efficiently serve its purposes, and whereby the device will be comparatively simple, non-encumbering and inexpensive in construction.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1 is a plan view of the improved view finder. Fig. 2 is a side elevation thereof. Fig. 3 is a longitudinal section of the device, taken on the line 3—3 of Fig. 1. Fig. 4 is a cross section taken on the line 4—4 of Fig. 3.

In carrying out the present invention, there is provided a cylindrical case or shell 1, which has its forward end open, and a convexed cap or closure 2 is fitted or otherwise engaged into the mouth or open end of the case or shell, the cap 2 being provided with a central lens 3, and with a lower foot piece or flange 4 for readily attaching the case or shell 1 to the camera or other similar contrivance.

The top or back of the case or shell 1 is provided intermediate of its ends with a transverse rectangular or elongated opening 5, while one side of the case or shell is provided with a longitudinal rectangular or elongated opening 6. Frosted glass panels or image glasses 7 and 8 are secured within the respective openings 5 and 6.

Disposed loosely within the case or shell 1 is an oscillatory sleeve or inner shell 9, having fitted therein a diagonal or oblique mirror or reflector 10. The forward end of the sleeve 9 is open, and preferably has a relatively narrow inturned flange or lip 11 to retain the mirror or reflector 10 in place. The sleeve 9 is also provided with an opening 12 above the mirror, whereby the image thrown upon the mirror 10 from the lens 3 will be reflected through the opening 12 against one or the other of the image glasses 7—8.

The rear end 13 of the sleeve or carrier 9 of the mirror 10, is in the form of a ball cage, the same having an inner annular ball race 14 for pivotally or anti-frictionally mounting the sleeve or carrier 9 within the case or shell 1. To this end, a bolt 15 is engaged centrally through the rear end of the case or shell 1, and a pair of ball cones 16 are mounted upon the bolt 15, the head 17 of the bolt 15 being disposed within the case 1 and bearing against the forward cone 16, while nuts 18 are threaded upon the outwardly projecting end of the bolt 15. A spacer washer 19 is preferably mounted upon the bolt 15 between the inner end of the case 1 and the rearmost cone 16, whereby when the nuts 18 are tightened, the cones 16 will be clamped rigidly in place. The ball cage 13 surrounds the cones 16, and an annular series of ball bearings 20 are disposed within the ball race 14 and the ball race formed by the cones 16, in order that the sleeve or carrier 9 may oscillate freely and without interference. It will be observed that the rear end of the carrier is so pivoted to the rear end of the case, as to swing about an axis parallel with the glasses or panels 7 and 8 and the sides of the case.

In order to hold the carrier or sleeve 9 at normal position with the opening 12 uppermost, a weight 21 of any suitable character is secured upon the bottom or lower portion of the sleeve 9.

As a means for limiting the movement of the sleeve or carrier 9, and for leveling the camera or other object to which the view finder is attached, the case or shell 1 is provided with an arcuate or transverse slot 22 adjacent its rear end and projecting slightly beyond the longitudinal median lines of the openings 5 and 6. A pointer or pin 23 is secured to the rear end of the sleeve 9 or the member 13 at the upper end of the mirror or reflector 10, and coöperates with suitable graduations 24 provided upon the case 1 adjacent the slot 22. The graduations 24 are arranged adjacent the ends of the slot 22 or in rear of the respective image glasses 7 and 8.

In use, the view finder may be readily attached to a camera or the like, and when the camera is adjusted in horizontal and vertical positions, the carrier 9 will automatically swing, under the influence of the weight 21, to bring the mirror 10 into coöperation with the proper image glass 7 or 8, according to the horizontal or vertical position of the camera. It is thus unnecessary for the operator or photographer to manually set the view finder, and the image will be properly reflected against the image glass 7 when the camera is horizontal, or against the image glass 8 when the camera is swung to a vertical position.

The present device will also assist in properly positioning the camera, the pointer 23 coöperating with the respective graduations 24 to indicate either the horizontal or vertical position of the camera, or the angular position thereof. The camera may thus be readily set to the horizontal or vertical position, which will also assure of the proper taking of the picture.

From the foregoing, the advantages and capabilities of the present device will be obvious to those versed in the art, without further comment being necessary.

Having thus described the invention, what is claimed as new is:

1. A view finder comprising a case having image panels, a shell disposed loosely within the case and having a rear ball cage, the ball cage having an annular ball race, the shell having forward and upper openings, means carried by the rear end of the case and provided with an annular ball race coöperable with the said cage, a series of ball bearings disposed within the said ball races, an oblique mirror mounted within the said shell, and a weight carried by the bottom of the shell.

2. A view finder comprising a case having image panels, a shell disposed loosely within the case and having a rear ball cage provided with an inner annular ball race, the shell having forward and upper openings, a bolt engaged through the rear end of the case, a pair of ball cones mounted upon the bolt within the ball cage, an annular series of ball bearings engaging the said ball cones and ball race, an oblique mirror fitted within the shell, and a weight carried by the bottom of the shell.

In testimony that I claim the foregoing as my own, I have hereto affixed my signature in the presence of two witnesses.

WALTER W. KING.

Witnesses:
WILLIAM J. WESTFALL,
TIMOTHY R. DWYER.